(12) United States Patent
Salanitri et al.

(10) Patent No.: US 8,008,406 B2
(45) Date of Patent: Aug. 30, 2011

(54) SYNTHESIS AND CHARACTERIZATION OF A NOVEL PROTON EXCHANGE MEMBRANE (PEM) FOR APPLICATIONS IN FUEL CELLS (75) Inventors: Marco Antonio Salanitri, Catania (IT); Giuseppe Consiglio, Catania (IT); Chiara Silvana Leo, Bari (IT); Stefania Calamia, Messina (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 541 days.

(21) Appl. No.: 12/120,661

(22) Filed: May 15, 2008

(65) Prior Publication Data

US 2009/0099331 A1    Apr. 16, 2009

(30) Foreign Application Priority Data

May 23, 2007   (IT) .............................. MI2007A1034

(51) Int. Cl.
C08F 28/00 (2006.01)
C08F 228/00 (2006.01)
C08G 75/24 (2006.01)
C08J 5/20 (2006.01)
H01M 4/86 (2006.01)

(52) U.S. Cl. ............... 525/328.5; 525/328.6; 525/328.8; 525/535; 528/391; 528/373; 521/25; 521/27; 429/80

(58) Field of Classification Search ................ 525/328.5, 525/328.6, 328.8, 535; 528/391, 373; 521/25, 521/27; 429/80
See application file for complete search history.

(56) References Cited

U.S. PATENT DOCUMENTS

| 4,950,731 | A | 8/1990 | Faler et al. ..................... 528/201 |
| 5,438,082 | A | 8/1995 | Helmer-Metzmann et al. ............... 522/149 |
| 6,869,980 | B2 | 3/2005 | Cui ................... 521/27 |
| 6,914,084 | B1 | 7/2005 | Soczka-Guth et al. ......... 521/27 |

OTHER PUBLICATIONS

Hibino et al; Solid electrolyte and fuel cell; 2005, Fujitsu Limited, Japan; Chem Abstract 143: 269603.*

* cited by examiner

*Primary Examiner* — Duc Truong
(74) *Attorney, Agent, or Firm* — Lisa K. Jorgenson; Allen, Dyer, Doppelt, Milbrath & Gilchrist, P.A.

(57) ABSTRACT

A fuel cell membrane is described comprising at least one sulfonated aromatic polyether copolymer comprising a polyarylen-ether-ketone (PEK) moiety or sulfonated derivatives thereof, deriving from spiro-bis-indane or 4,4'-(hexafluoroisopropylidene)diphenol (BPAF), and an arylene-sulfone, or an arylene-ketone or sulfonated derivative thereof; said copolymer having the following formula (1):

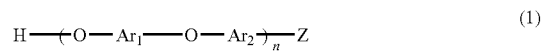

(1)

wherein $Ar_1$ has formula,

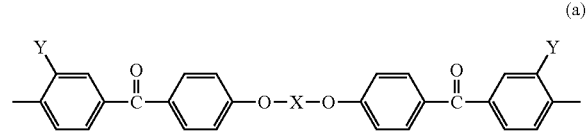
(a)

wherein X is spiro-bis-indanile (SBI) (b) or BPAF (c) having formulas:

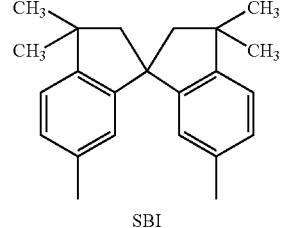

(b)

SBI

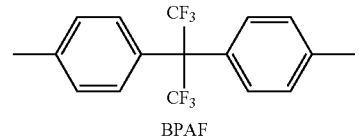
(c)

BPAF and wherein Y is H or $SO_3H$, and $Ar_2$ has formula

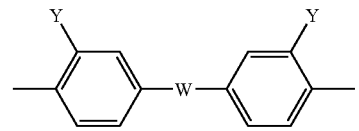

wherein W is CO or $SO_2$, and Y is H or $SO_3H$, wherein Z is OH or Cl; and wherein at least one between $Ar_1$ or $Ar_2$ comprise at least one sulfonic group; and wherein n is an integer comprised between 2 and 50. A method for the production of such membrane is also described.

6 Claims, 1 Drawing Sheet

FIG. 1
PRIOR ART

SYNTHESIS AND CHARACTERIZATION OF A NOVEL PROTON EXCHANGE MEMBRANE (PEM) FOR APPLICATIONS IN FUEL CELLS

FIELD OF THE INVENTION

In its general aspect, the invention relates to membranes for fuel cells.

In particular, the invention relates to the synthesis and characterization of novel proton exchange membranes and their application in fuel cells.

BACKGROUND OF THE INVENTION

Proton exchange membrane fuel cells:
PEM fuel cells are widely popular fuel cells which find application mainly in the automotive sector, where they are expected one day to replace gasoline and diesel internal combustion engines, and in the domestic sector, for example, as replacements for rechargeable batteries.

Figure 1:
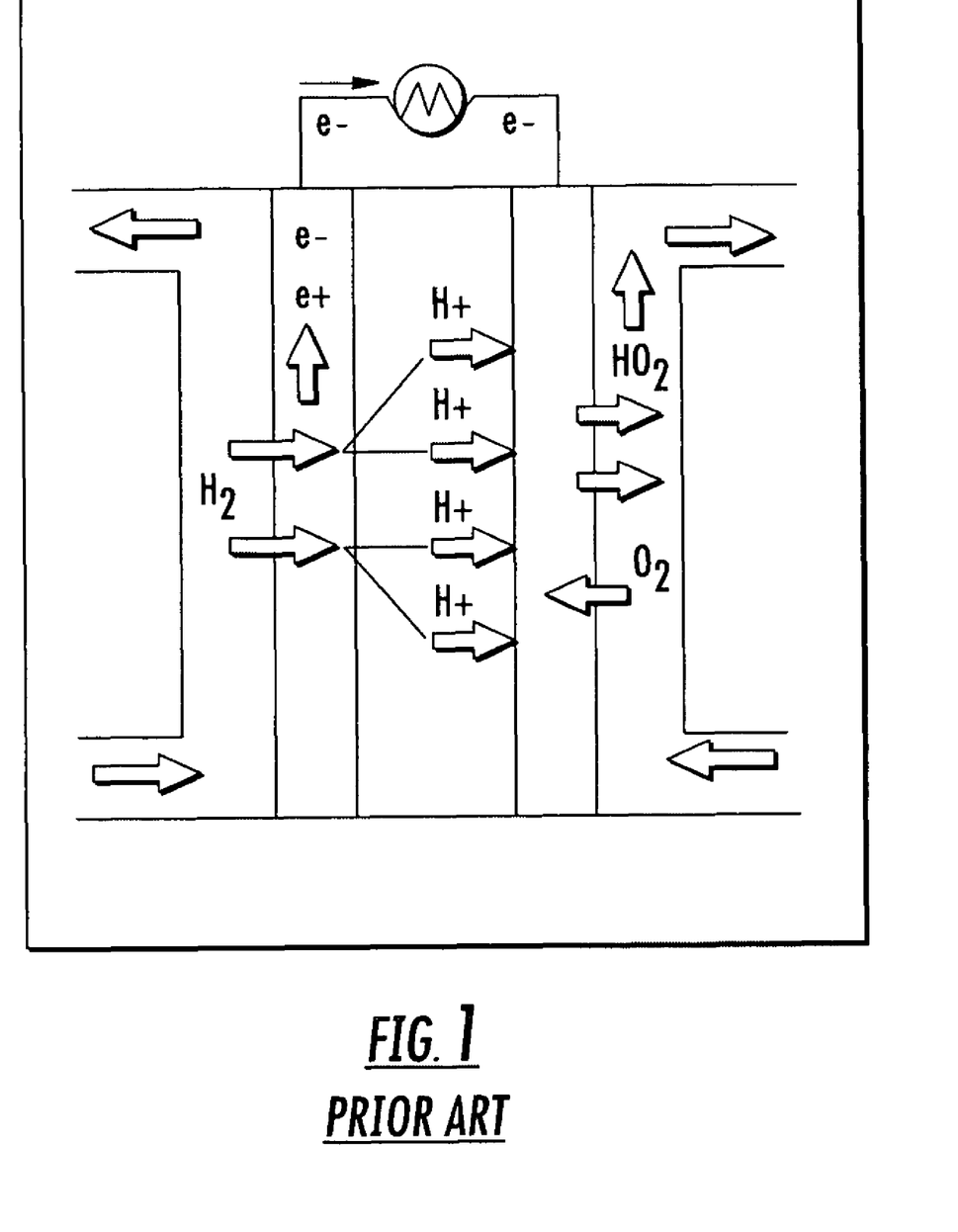
FIG. 1 is a schematic representation of the fuel cell of the invention.

PEMFCs are typically fuelled by hydrogen molecules and comprise a solid proton exchange membrane, in the form of a thin film (usually 125-180 μm thick) sandwiched between an anode and a cathode (see FIG. 1). The hydrogen molecules are fed at the anode, where they are split into hydrogen ions ($H^+$) and electrons ($e^-$) by a platinum catalyst. The membrane lets through $H^+$ ions and, by way of its electrically insulating nature, leaves behind the electrons, which create an electron flow through an external circuit, and produce electric power and heat. At the opposite end, the cathode receives the hydrogen ions exiting the membrane, the electrons (which have traveled through the external circuit) and the oxygen (provided by the surrounding air), thus producing water, which flows out of the cell. The only waste product is water vapor and/or liquid water.

The entire process can thus be summarized by way of the following reactions:

Anode: $2H_2 => 4H^+ + 4e^-$

Cathode: $O_2 + 4H^+ + 4e^- => 2H_2O$

Overall cell reaction: $2H_2 + O_2 => 2H_2O$

PEM fuel cells are suitable for many applications in which a light, compact, and relatively inexpensive power source is required. As water is the only liquid present in the cell, the typical operational temperature is around 80° C. (60-100° C.), which makes it ideal for those applications which require rapid start-up. Given such relatively low operational temperature, the use of catalysts (usually platinum-based) is mandatory.

These cells are typically associated with an efficiency in the order of 40-50% and the production of about 0.8 volts. Cells can be arranged in series or in parallel to achieve the desired voltage. To run a car, for example, about 300 volts are required. Electrical power in the order of 50 kW has been achieved and units producing up to 250 kW are currently under development.

Although they are efficient and convenient under most practical circumstances, PEMFCs do suffer from a number of drawbacks. Firstly, the amount of water evaporating must always be lower than the amount being generated, as the cell cannot be allowed to dry out. Moisture control is thus essential.

Secondly, due to the low temperature of operation (imposed by the water-based nature of the cell), there is the need for high quantities of highly sensitive catalysts, which can be expensive.

Moreover, the sensitive catalysts require pure hydrogen as fuels meaning that the cell must be free of impurities.

The operational limit of 100° C. is not ideal as it is not usually a high enough temperature to perform useful co-generation. Finally, the membrane materials can be very expensive.

There is, therefore, a strong-felt need in the field for the production of proton electrolyte membranes capable of operating at temperatures higher than 100° C. and of PEMFCs capable of supporting more tolerant catalyst systems.

Solid electrolyte membranes suitable for PEMFCs are conventionally made of solid organic perfluorinated polymers, such as, for example poly-perfluorosulphonic acid.

One such membrane, which is commercially available and widespread, is Nafion™ (by DuPont), a perfluorinated polymer with side chains terminating in sulfonic acid moieties. With a membrane thickness in the range of 50 to 175 μm, they exhibit high proton conductivity, high chemical stability under typical operating conditions and low gas permeability. Disadvantages typical of these membranes include their high synthesis costs, due to the fluorinated monomers, low proton conductivity at low water content, low mechanical resistance at temperatures above 100° C., and finally, membrane cross-over problems.

Styrene derivatives, consisting of a fluorinated monomer chain backbone side-linked to styrenic rings, are also quite popular choices for the manufacture of proton electrolyte membranes. Such membranes, however, exhibit very low oxidative stability.

Recently, in the effort to overcome the limits of the existing membranes, research has focused on the development of membranes based on sulfonated polyether polymers.

U.S. Pat. No. 6,869,980, recently granted to Cui (Mar. 22, 2005) discloses novel polymer blend membranes comprising a functional polymer based on sulfonated aryl polymers, a reinforcing polymer based on aminated or nitrated polyether sulfones and/or polyether ether sulfone and a plasticizer as PVDF.

U.S. Pat. No. 6,914,084 B1 (Jul. 5, 2005, to Soczka-Guth et al.) discloses fuel cell membranes comprising sulfonated polyether ketone and another polymer, a process for their production and their use. The membrane contains: sulfonated, strictly alternating, polyether ketones (A) (30-99.5% by weight) with repeating units of formula (I): —Ar—O—Ar'—CO, (I), where Ar and Ar' are, independently of one another, bivalent aromatic radicals, with ion exchange capacity comprised between 1.3 and 4.0 meq. (—SO3H)/g (polymer) and from 0.5 to 70% by weight of a fluorinated, nonfluorinated or perfluorinated polymer (B).

European Patent No. 0574791 (also published as U.S. Pat. No. 5,438,082) to Helmer-Metzmann discloses the manufacture of a polymer electrolyte membrane from sulfonated, aromatic polyether ketone, an aromatic polyether ketone of the formula (I)

(I)

in which Ar is a phenylene ring having p- and/or m-bonds, Ar' is a phenylene, naphthylene, biphenylene, anthrylene or another divalent aromatic unit, X, N and M, independently of one another are 0 or 1, Y is 0, 1, 2 or 3, P is 1, 2, 3 or 4, is sulfonated and the sulfonic acid is isolated. At least 5% of the sulfonic groups in the sulfonic acid are converted into sulfonyl chloride groups, and these are reacted with an amine containing at least one crosslinkable substituent or a further functional group, and unreacted sulfonyl chloride groups are subsequently hydrolyzed. The resultant aromatic sulfonamide is isolated and dissolved in an organic solvent, the solution is converted into a film, and the crosslinkable substituents in the film are then crosslinked. In specific cases, the crosslinkable substituents can be omitted. In this case, sulfonated polyether ketone is converted into a film from solution.

The technical problem underlying the present invention is thus that of providing a novel proton electrolyte membrane suitable for use in fuel cells, which exhibits high proton conductivity (higher than $10^{-2}$ S/cm) while maintaining a low electronic conductivity, a low permeability to fuel and oxidant (lower than $10^{-7}$ cm$^2$/s), oxidative, thermal and hydrolytic stability at temperatures higher than 100° C., low water uptake (lower than 30%) and finally, good mechanical properties in both the dry and hydrated state.

SUMMARY OF THE INVENTION

Such a technical problem has been solved by a fuel cell proton-conductive membrane comprising at least one sulfonated aromatic polyether copolymer comprising a polyarylen-ether-ketone moiety or sulfonated derivatives thereof, deriving from spiro-bis-indane or 4,4'-(hexafluoroisopropylidene)diphenol, and an arylene-sulfone, or an arylene-ketone or sulfonated derivative thereof; said copolymer having the following formula (1):

(1)

wherein Ar$_1$ has formula

(a)

wherein X is spiro-bis-indanile or 4,4'-(hexafluoroisopropylidene)diphenol of formulas (b)

SBI (c)

BPAF and wherein Y is H or SO$_3$H, and wherein the symbol "|" on the benzene rings indicate the position where X is bonded to the rest of the moiety; and Ar$_2$ has formula

(d)

wherein W is CO or SO$_2$, and Y is H or SO$_3$H;

wherein Z is OH or Cl;

wherein at least one between Ar$_1$ and Ar$_2$ comprise at least one sulfonic group; and wherein n is an integer comprised between 2 and 50, preferably between 10 and 25.

Preferably, the sulfonated copolymers of the invention are poly(ether ketone ketone) or poly(ether ketone sulfone) having formula (1) and wherein Ar$_1$ is a moiety chosen from the group consisting of:

(e)

(f)

(g)

(h)

and Ar$_2$ is a moiety chosen from the group consisting of:

(i)

(l)

(m)

-continued (n)

According to a preferred embodiment of the invention, the sulfonated copolymer of the invention is chosen from the group consisting of the copolymers of formula:

(o)

(p)
(q)
(r)

wherein n is an integer comprised between 2 and 50, preferably between 10 and 25 and Z is OH or Cl.

According to a preferred embodiment of the invention, the sulfonated copolymer is:

(s)

wherein n is an integer comprised between 2 and 50, preferably between 10 and 25 and Z is OH or Cl.

The present invention also includes a method for the production of a fuel cell membrane comprising at least one sulfonated aromatic polyether copolymer having formula (1) as described above, the method comprising the following steps:

a) Synthesis of a protected diphenylketone, chosen from the group comprising 4-chloro-4'-hydroxybenzophenone and 4-fluoro-4'-hydroxybenzophenone, preferably FHDPK;

b) Condensation of a HO—X—OH compound, chosen in the group consisting of spiro-bis-indanol, 4,4'-(hexafluoroisopropylidene) diphenol, and sulfonated derivatives thereof, and the protected diphenylketone of step a) to form at least one HO—Ar$_1$—OH compound protected on the hydroxyl groups;

c) Hydrolysis of the protected HO—Ar$_1$—OH compound of step b) to form at least one HO—Ar$_1$—OH compound; and d) Polycondensation of the HO—Ar$_1$—OH compound of step c) with a J-Ar$_2$-J compound, where Ar$_2$ is chosen in the group of formula d) and J is a leaving group, preferably a halogen, for example Cl or Br, preferably disodium salt of sulfonated dichlorodiphenylsulfone to form at least one copolymer of formula 1, preferably SBI-FHDPK-S-DCDPS.

Preferably, step a) is preceded by an anhydrification step of the HO—X—OH compounds.

Preferably, the hydroxyl group of DPK is protected using benzyl, methyl, acetyl or silyl moieties.

Preferably, condensation of HO—X—OH and protected DPK is carried out refluxing NMP or other polar aprotic solvents chosen in the group comprising DMAc, DMF and DMSO.

Polycondensation is carried out according to methods well known in the field.

The present invention also comprises the use of the above membranes for the manufacture of PEMFCs, according to methods well known in the field.

DETAILED DESCRIPTION OF THE PREFERRED EMBODIMENTS

The fuel cell membrane of the invention and its method of production will now be described in further detail.

The fuel cell membrane according to one embodiment of the invention is produced from sulfonated copolymers synthesized by polycondensation of spiro-bis-indanol via a nucleophilic aromatic substitution mechanism.

Spiro-bis-indanol is a spiro compound of formula:

and as such is characterized in that it is a bicyclic organic compound with rings connected through just one carbon atom.

U.S. Pat. No. 4,950,731 describes the synthesis of spiro-bis-indane bisphenols. In order to use spiro-bis-indane bisphenol for the synthesis of polymers, it was anhydrated via azotropic distillation with toluene.

S-DCDPS (II) is the disodium salt of sulfonated dichlorodiphenylsulfone of formula:

Example 1

Anhydrification of spiro-bis-indanol 25 g of spiro-bis-indanol hemihydrate were mixed with 400 ml of toluene, and the slurry obtained heated to reflux under a nitrogen atmosphere. The azeotropic mixture was collected in a Dean-Stark trap until no more water distilled off (3 hours). Toluene was distilled off till the final volume of the solution was about 250 ml. After cooling, the white needles formed were filtered, washed with cyclohexane, and dried under vacuum to give 23.5 g of the anhydrous spiro-bis-indanol (96% of theoretical yield).

Example 2

Synthesis of Protected FHDPK (III)

21.62 g of 4-fluoro-4'-hydroxybenzophenone, 11.51 g of benzylchloride, 16.58 g of anhydrous potassium carbonate, and 100 ml of acetonitrile were refluxed under nitrogen for 18 hours. After cooling, the mixture was poured into 500 ml of water, and the white solid precipitated was filtered by suction, washed with water, and dried on the filter. The crude product was crystallized from a mixture of ethanol (200 ml) and acetonitrile (60 ml), to yield the desired product as off-white needles (27.6 g, 90% of theoretical yield).

Example 3

Synthesis of Protected SBI-FHDPK (IV)

(IV)

3.08 g of anhydrous spiro-bis-indanol, 6.12 g of compound (II), 3.32 g of anhydrous potassium carbonate, 30 ml of N-methyl-2-pyrrolidone, and 15 ml of toluene (NMP/toluene volume ratio of 2:1) were heated to reflux under nitrogen. The azeotropic mixture was collected in a Dean-Stark trap until no more water distilled off (3 hours). Toluene was distilled off, and the NMP solution so obtained was heated to 170° C. for 18 hours. After cooling, the mixture was poured into 300 ml of water, with stirring. The white solid so formed was filtered and washed with water. The crude solid was boiled for one hour with ethanol (100 ml×2), cooled down to room temperature and filtered. The purified solid was dried under vacuum to yield the desired product as a white powder (8.37 g, 95% of theoretical yield).

Example 4

Synthesis of SBI-FHDPK (V)

(V)

4.41 g of protected bisphenol (III) and 20 ml of a solution of hydrogen bromide in acetic acid (45% w/w) were reacted for 24 hours, at room temperature under nitrogen (the solid dissolved slowly during the reaction). The clear solution so obtained was poured into water (200 ml), the precipitated solid was filtered and washed with water till the filtrate was neutral, and dried under vacuum. The off-white solid was crystallized from ethyl acetate to give 2.45 g of white powder (70% of theoretical yield).

Example 5

Synthesis of Polymer SPI-FHDPK-S-DCDPS (VI)

2.8033 g (4.0 mmol) of compound (V), 1.9650 g (4.0 mmol) of disodium salt of sulfonated dichlorodiphenilsulfone S-DCDPS (II), and 1.33 g (9.6 mmol) of potassium carbonate were added to 20 ml of N-methylpyrrolidone and 10 ml of toluene (NMP/toluene volume ratio of 2:1), in a 3-neck round-bottom flask equipped with overhead mechanical stirrer, nitrogen inlet and a Dean Stark trap. The reaction mixture was then heated under reflux for 4 hours to anhydrate the system. The temperature was raised slowly by controlled removal of the toluene. The reaction mixture was then refluxed for 24 hours, during which time, the mixture became considerably viscous. The solution was then cooled to room temperature and diluted with dimethylacetamide. The solution was filtered to remove most of the salts and poured in water (1000 ml). The precipitated copolymer was then washed several times with deionized water to further remove salts, by soaking in deionized water at 60° C. overnight.

(VI)

Finally, the filtered copolymer was vacuum dried at 120° C. for 24 hours (3.01 g, 65% of theoretical yield).

The copolymer thus formed can be used for the preparation of membranes suitable for use in fuel cells according to methods known in the field.

The other poly-arylen-ethers according to formula 1 can be prepared by the procedure illustrated above. The spiro-bis-indanol monomer can be replaced, using the same method, with the BPAF monomer in order to prepare fluorinated membranes, which could be more stable to oxidation processes. Alternatively, the sulfonic groups can be linked to different positions of the repeating unit, according to methods familiar to the person skilled in the field, to get copolymers with different mechanical and chemical properties. The other moieties that form the copolymer can be prepared using the same procedure as above, condensing the corresponding bisphenol and the dihaloarene, in the presence of potassium carbonate, as described above.

The membranes thus formed can be used in the assembling of a fuel cell, according to methods known in the field.

The method of the invention benefits from the fact that spiro-bis-indanol lacks acidic receptor sites and is therefore not affected by an acid environment. Sulfonated derivatives of spiro-bis-indanol have satisfactory mechanical and oxidative stability and are thus suitable as starting materials for the synthesis of the proton exchange membranes according to the invention. Derivatives of BPAF have a better chemical stability, and could be used where this property is a crucial factor.

The membranes prepared according to the present invention, therefore exhibit the following advantages: good mechanical properties, stability in oxidative and acid conditions, no cross-over of fuel and reaction gases across the membrane, easy processability (as they are soluble in most organic solvents), easy functionalization, innovation and improvement of the membrane, and finally, low production costs.

That which is claimed is:

1. A fuel cell membrane comprising:
at least one sulfonated aromatic polyether copolymer comprising a poly-arylen-ether-ketone (PEK) moiety or sulfonated derivatives thereof; said copolymer having the following formula (1):

(1)

wherein $Ar_1$ has formula, (a)

wherein X is Spiro-bis-indanile (SBI) (b) or 4,4'-(hexafluoroisopropylidene) diphenol (BPAF) (c) having formulas:

SBI
(b)

BPAF
(c)

and wherein Y is H or $SO_3H$, and $Ar_2$ has formula (d)

wherein W is CO or $SO_2$, and Y is H or $SO_3H$;
wherein Z is OH or Cl;
and wherein at least one between $Ar_1$ or $Ar_2$ comprise at least one sulfonic group; and wherein n is an integer comprised between 2 and 50 and said copolymer exhibits proton conductivity higher than $10^{-2}$ S/cm and the permeability to fuel and oxidant lower than $10^{-7}$ cm$^2$/s.

2. The fuel cell membrane of claim 1, wherein $Ar_1$ is selected from the group consisting of:

(e)

(f)

(g)

(h)

3. The fuel cell membrane of claim 1, wherein $Ar_2$ is chosen from the group consisting of:

(i)

(l)

(m)

-continued

(n)

4. The fuel cell membrane of claim 1, wherein n is an integer comprised between 10 and 25.

5. The fuel cell membrane of claim 1, wherein said at least one sulfonated copolymer is selected from the group consisting of the copolymers of formula:

(o)

(p)

(q)

(r)

wherein n and Z have the same meaning as defined in claim 1.

6. The fuel cell membrane of claim 1, wherein said at least one sulfonated copolymer comprises:

(s)

wherein n and Z have the same meaning as defined in claim 1.

\* \* \* \* \*

UNITED STATES PATENT AND TRADEMARK OFFICE
CERTIFICATE OF CORRECTION

PATENT NO.         : 8,008,406 B2
APPLICATION NO.    : 12/120661
DATED              : August 30, 2011
INVENTOR(S)        : Salanitri et al.

Page 1 of 1

It is certified that error appears in the above-identified patent and that said Letters Patent is hereby corrected as shown below:

Column 11, Line 35    Delete: "SPI"
                      Insert: --SBI--

Column 18, Line 20    Delete:

Insert:

Signed and Sealed this
Twenty-fourth Day of July, 2012

David J. Kappos
*Director of the United States Patent and Trademark Office*